United States Patent
Xie et al.

(10) Patent No.: US 9,621,455 B2
(45) Date of Patent: Apr. 11, 2017

(54) CROSS-DEVICE LINEAR MULTIPLEX SECTION PROTECTION METHOD, GATEWAY AND CONTROLLER

(71) Applicant: Huawei Technologies Co., Ltd., Shenzhen (CN)

(72) Inventors: Zhenfeng Xie, Shenzhen (CN); Ping Shi, Shenzhen (CN); Xiaohu Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 14/744,717

(22) Filed: Jun. 19, 2015

(65) Prior Publication Data

US 2015/0288600 A1 Oct. 8, 2015

Related U.S. Application Data

(63) Continuation of application No. PCT/CN2013/088719, filed on Dec. 6, 2013.

(30) Foreign Application Priority Data

Dec. 20, 2012 (CN) .......................... 2012 1 0558887

(51) Int. Cl.
*H04L 12/703* (2013.01)
*H04W 24/04* (2009.01)
(Continued)

(52) U.S. Cl.
CPC .......... *H04L 45/28* (2013.01); *H04L 41/0654* (2013.01); *H04W 24/04* (2013.01); *H04W 88/12* (2013.01); *H04W 88/16* (2013.01)

(58) Field of Classification Search
CPC .... H04L 45/28; H04L 41/0654; H04W 24/04; H04W 88/12; H04W 88/16
See application file for complete search history.

(56) References Cited

U.S. PATENT DOCUMENTS

| 6,449,250 B1 | 9/2002 | Otani et al. |
| 2001/0005358 A1* | 6/2001 | Shiozawa ........... H04L 41/0663 370/228 |

(Continued)

FOREIGN PATENT DOCUMENTS

| CN | 1617476 A | 5/2005 |
| CN | 101783743 A | 7/2010 |

(Continued)

OTHER PUBLICATIONS

ITU-T, Series G: Transmission Systems and Media, Digital Systems and Networks, International Telecommunication Union, G.841, Oct. 1998, 201 pages.

*Primary Examiner* — Andrew Lai
*Assistant Examiner* — Sumitra Ganguly
(74) *Attorney, Agent, or Firm* — Brinks Gilson & Lione

(57) ABSTRACT

A cross-device linear multiplex section protection method, including: a controller receives a first negotiation message transmitted by a first gateway, the first negotiation message is transmitted when the first gateway detects that a failure occurs in a link between the first gateway and a second gateway; the controller transmits a second negotiation message to the first gateway and the second gateway, the second negotiation message is used for indicating bridging service data on an active link to a protection link for transmission, the active link is a link between the second gateway and the controller, and the protection link is a link between the first gateway and the controller.

11 Claims, 6 Drawing Sheets

(51) Int. Cl.
*H04L 12/24* (2006.01)
*H04W 88/12* (2009.01)
*H04W 88/16* (2009.01)

(56) References Cited

U.S. PATENT DOCUMENTS

| | | | |
|---|---|---|---|
| 2004/0156310 A1* | 8/2004 | Fredette | H04L 45/00 370/216 |
| 2005/0099941 A1 | 5/2005 | Sestito et al. | |
| 2008/0002669 A1 | 1/2008 | O'Brien et al. | |
| 2008/0101314 A1* | 5/2008 | Bachmutsky | H04L 43/0817 370/342 |
| 2011/0299386 A1 | 12/2011 | Negoto et al. | |
| 2012/0106360 A1 | 5/2012 | Sajassi et al. | |

FOREIGN PATENT DOCUMENTS

| | | |
|---|---|---|
| CN | 102035680 A | 4/2011 |
| CN | 102546206 A | 7/2012 |
| CN | 102547819 A | 7/2012 |
| CN | 102752126 A | 10/2012 |
| CN | 103052106 A | 4/2013 |
| EP | 1 349 347 A2 | 10/2003 |
| EP | 1 727 309 A1 | 11/2006 |

\* cited by examiner

CROSS-DEVICE LINEAR MULTIPLEX SECTION PROTECTION METHOD, GATEWAY AND CONTROLLER

CROSS-REFERENCE TO RELATED APPLICATIONS

This application is a continuation of International Application No. PCT/CN2013/088719, filed on Dec. 6, 2013, which claims priority to Chinese Patent Application No. 201210558887.7, filed on Dec. 20, 2012, both of which are incorporated herein by reference in their entireties.

TECHNICAL FIELD

The present invention relates to the field of communication technologies, and particularly to a cross-device linear multiplex section protection method, a gateway and a controller.

BACKGROUND

An automatic protection switching (APS) is an important feature of the synchronous digital hierarchy (SDH) network. APS is to protect one or more active paths with one protection path, when the active path fails, service transmitted on the original active path will automatically switch to the protection path, so as to prevent user data loss and improve reliability of the network. An APS protocol is transmitted through K1 byte and K2 byte in an multiplex section overhead (MSOH). K1 byte is to transmit a switching request signal, and K2 byte is to transmit a bridging status signal, and the purpose of switching and switching-back between the active path and the protection path can be achieved through signal transmitting of K1 byte and K2 byte. APS protection structure can be classified into 1+1 and 1:n, where 1+1 is to provide one protection path for each active path, while 1:n is to provide one protection path for n active paths. APS may protect the active path within one device, and may also protect the active path across devices.

Taking a cross-device APS as an example, an APS with a protection structure of 1:1 is deployed between a base station side and a base station controller (BSC)/radio network controller (RNC) gateway, a base station connects an active radio network controller site gateway (RSG) and a standby RSG respectively through a cell site gateway (CSG), then the active RSG connects to a BSC/RNC through an active path, and the standby RSG connects to the BSC/RNC through a protection path. When the active path between the active RSG and the BSC/RNC fails, the standby RSG negotiates with the BSC/RNC through K1 byte and K2 byte upgrades the standby RSG to be active and notifies the CSG, and activates a pseudo wire (PW) between the RSG and the CSG; moreover, the standby RSG notifies the active RSG through an inter-frame link, and the active RSG degrades to be standby after receiving a notification message, and then deactivates the PW between the RSG and the CSG. Thereby, service data originally transmitted on the active path is switched to the protection path, so as to prevent user data loss.

In the above scenario, if the inter-frame link between the active RSG and the standby RSG fails, the service will be interrupted, and thus the user experience is degraded.

SUMMARY

A cross-device linear multiplex section protection method is provided, so as to alleviate the problem of service interruption caused by link failure between the active RSG and the standby RSG and improve the user experience.

In a first aspect, a cross-device linear multiplex section protection method, including:

receiving, by a controller, a first negotiation message transmitted by a first gateway, the first negotiation message is transmitted when the first gateway detects that a failure occurs in a link between the first gateway and a second gateway;

transmitting, by the controller, a second negotiation message to the first gateway and the second gateway, so that the second gateway degrades to a standby status according to the second negotiation message, where the second negotiation message is used for indicating bridging service data on an active link to a protection link for transmission, the active link is a link between the second gateway and the controller, and the protection link is a link between the first gateway and the controller.

In a first possible implementation, the method further includes: receiving, by the controller, a third negotiation message transmitted by the first gateway, the third negotiation message is used for indicating that the bridging of the service data is completed.

The first negotiation message includes K1 byte bridging request information and K2 byte bridging status indication information, the K1 byte bridging request information is used for indicating that a failure occurs in the active link, and the K2 byte bridging status indication information is used for indicating that the bridging of the current service data does not occur.

The second negotiation message includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

In a second possible implementation by combining the first aspect or the first possible implementation of the first aspect, the third negotiation message transmitted by the transmitting unit includes K1 byte bridging request information and K2 byte bridging status indication information, the K1 byte bridging request information is used for indicating that a failure occurs in the active link, and the K2 byte bridging status indication information is used for indicating that the current service data is bridged from the active link.

In a second aspect, a cross-device linear multiplex section protection method, including:

receiving, by a second gateway, a second negotiation message transmitted by a controller, where the second negotiation message is used for indicating bridging service data on an active link to a protection link for transmission, the active link is a link between the second gateway and the controller, and the protection link is a link between a first gateway and the controller; and degrading, by the second gateway, to a standby status.

In the first possible implementation, the second negotiation message includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

Optionally, the degrading, by the second gateway, to the standby status, includes:

setting the active link as a standby status;

degrading a pseudo wire (PW) between the second gateway and a third gateway to a standby status, and transmitting a notification message to the third gateway, the third gateway is a cell site gateway connected to a base station.

In a third aspect, a cross-device linear multiplex section protection method, including:

detecting, by a first gateway, a link failure;

transmitting, by the first gateway, a first negotiation message to a controller when it is detected that a failure occurs in a link between the first gateway and a second gateway, where the first negotiation message is used for indicating that a failure occurs in an active link and requesting to the controller for bridging service data on the active link to a protection link, the active link is a link between the second gateway and the controller, and the protection link is a link between the first gateway and the controller;

receiving, by the first gateway, a second negotiation message transmitted by the controller, and upgrading to an active status according to the second negotiation message, where the second negotiation message is used for indicating bridging the service data on the active link to the protection link for transmission; and transmitting, by the first gateway, a third negotiation message to the controller, the third negotiation message is used for indicating that the bridging of the service data is completed.

In the first possible implementation, the upgrading to the active status according to the second negotiation message, includes:

setting the protection link as an active status;

upgrading a pseudo wire (PW) between the first gateway and a third gateway to an active status, and transmitting a notification message to the third gateway, the third gateway is a cell site gateway connected to a base station.

The first negotiation message includes K1 byte bridging request information and K2 byte bridging status indication information, the K1 byte bridging request information is used for indicating that a failure occurs in the active link, and the K2 byte bridging status indication information is used for indicating that the bridging of the current service data does not occur.

The second negotiation message includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

The third negotiation message includes K1 byte bridging request information and K2 byte bridging status indication information, the K1 byte bridging request information is used for indicating that a failure occurs in the active link, and the K2 byte bridging status indication information is used for indicating that the current service data is bridged from the active link.

In a fourth aspect, a controller, including:

a receiving unit, configured to receive a first negotiation message transmitted by a first gateway, the first negotiation message is transmitted when the first gateway detects that a failure occurs in a link between the first gateway and a second gateway;

a transmitting unit, configured to transmit a second negotiation message to the first gateway and the second gateway respectively according to the first negotiation message, received by the receiving unit, so that the second gateway degrades to a standby status according to the second negotiation message, where, the second negotiation message is used for indicating bridging service data on an active link to a protection link for transmission, the active link is a link between the second gateway and the controller, and the protection link is a link between the first gateway and the controller.

In a first possible implementation, the receiving unit is further configured to: receive a third negotiation message transmitted by the first gateway, the third negotiation message is used for indicating that the bridging of the service data is completed.

The first negotiation message received by the receiving unit, includes K1 byte bridging request information and K2 byte bridging status indication information, the K1 byte bridging request information is used for indicating that a failure occurs in the active link, and the K2 byte bridging status indication information is used for indicating that the bridging of the current service data does not occur.

The second negotiation message transmitted by the transmitting unit, includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

In a second possible implementation by combining the fourth aspect or the first possible implementation of the fourth aspect, the third negotiation message received by the receiving unit includes, K1 byte bridging request information and K2 byte bridging status indication information, the K1 byte bridging request information is used for indicating that a failure occurs in the active link, and the K2 byte bridging status indication information is used for indicating that the current service data is bridged from the active link.

In a fifth aspect, a second gateway, includes:

a receiving unit, configured to receive a second negotiation message transmitted by a controller, the second negotiation message is used for indicating bridging service data on an active link to a protection link for transmission, the active link is a link between the second gateway and the controller, and the protection link is a link between a first gateway and the controller; and a processing unit, configured to degrade the second gateway to a standby status according to the second negotiation message received by the receiving unit.

In the first possible implementation, the second negotiation message received by the receiving unit includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

Optionally, the processing unit includes:

a first processing subunit, configured to set the active link as a standby status according to the second negotiation message received by the receiving unit; and a second processing subunit, configured to degrade a pseudo wire (PW) between the second gateway and a third gateway to a standby status according to the second negotiation message received by the receiving unit, and transmit a notification message to the third gateway, the third gateway is a cell site gateway connected to a base station.

In a sixth aspect, a first gateway, includes:

a detecting unit, configured to detect a link failure;

a transmitting unit, configured to transmit a first negotiation message to a controller when it is detected by the detecting unit that a failure occurs in a link between the first gateway and a second gateway, where the first negotiation message is used for indicating that a failure occurs in an active link and requesting to the controller for bridging service data on the active link to a protection link, the active link is a link between the second gateway and the controller, and the protection link is a link between the first gateway and the controller;

a processing unit, configured to receive a second negotiation message transmitted by the controller, and upgrade the first gateway to an active status according to the second negotiation message, where the second negotiation message is used for indicating bridging service data on the active link to the protection link for transmission;

where the transmitting unit is further configured to transmit a third negotiation message to the controller, wherein the third negotiation message is used for indicating that the bridging of the service data is completed.

In a first possible implementation, the processing unit includes:

a first processing subunit, configured to set the active link as an active status; and a second processing subunit, configured to upgrade a pseudo wire (PW) between the first gateway and a third gateway to an active status, and transmit a notification message to the third gateway, the third gateway is a cell site gateway connected to a base station.

The first negotiation message transmitted by the transmitting unit includes K1 byte bridging request information and K2 byte bridging status indication information, the K1 byte bridging request information is used for indicating that a failure occurs in the active link, and the K2 byte bridging status indication information is used for indicating that the bridging of the current service data does not occur.

The second negotiation message received by the processing unit, includes K1 byte bridging request information and K2 byte bridging status indication information, the K1 byte bridging request information is used for indicating bridging the service data to the protection link, and the K2 byte bridging status indication information is used for indicating that the current service data is bridged from the active link.

The third negotiation message transmitted by the transmitting unit, includes K11 byte bridging request information and K2 byte bridging status indication information, the K1 byte bridging request information is used for indicating that a failure occurs in the active link, and the K2 byte bridging status indication information is used for indicating that the current service data is bridged from the active link.

In the embodiments above, the first gateway detects a link between the first gateway and the second gateway; when a failure occurs in the link, the first gateway transmits a first negotiation message to the controller and requests the controller to upgrade the first gateway itself to be an active status; after the controller receives the first negotiation message, the controller transmits a second negotiation message to the first gateway and the second gateway respectively, and notifies the first gateway and the second gateway to perform bridging of service data, to bridge the service of the second gateway to the first gateway; the second gateway degrades both the active link and the pseudo wire (PW) to be the standby status after receiving the second negotiation message; the first gateway upgrades both the protection link and the pseudo wire to be the active status after receiving the second negotiation message, and then transmits a third negotiation message to the controller to notify the controller that the bridging of the service data is completed. The technical solutions described in embodiments of the present invention alleviate the service interruption caused by link failure between the first gateway and the second gateway, and thus reliability of the system and the user experience are improved.

BRIEF DESCRIPTION OF DRAWINGS

To illustrate the technical solutions in embodiments of the present invention more clearly, accompanying drawings needed in the embodiments are illustrated briefly in the following. Apparently, the accompanying drawings show certain embodiments of the present invention, and persons skilled in the art can derive other drawings from them without creative efforts.

DESCRIPTION OF EMBODIMENTS

The technical solutions in embodiments of the present invention are hereinafter described clearly with reference to the accompanying drawings in embodiments of the present invention. Obviously, the embodiments described here are merely a part of embodiments of the invention, rather than all of the embodiments. All other embodiments, which can be derived by persons skilled in the art from the embodiments given herein without creative efforts, shall fall within the protection scope of the present invention.

In order to make the advantages of technical solutions of the present invention more comprehensible, a detailed description is given below with reference to the accompanying drawings and the embodiments.

Figure 1:
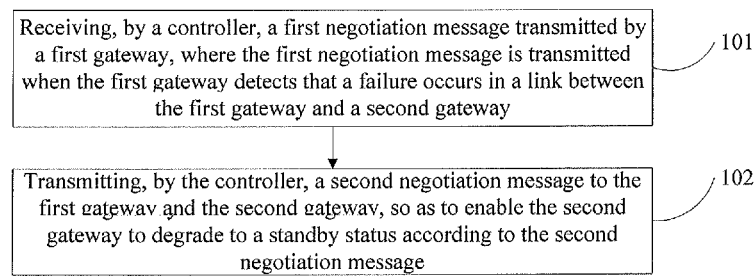
FIG. 1 is a flow chart of a method according to an embodiment of the present invention.

An embodiment of the present invention provides a cross-device linear multiplex section protection method, as shown in FIG. 1, the method includes:

101, Receiving, by a controller, a first negotiation message transmitted by a first gateway, where the first negotiation message is transmitted when the first gateway detects that a failure occurs in a link between the first gateway and a second gateway.

The first negotiation message includes K1 byte bridging request information and K2 byte bridging status indication information, the K1 byte bridging request information is used for indicating that a failure occurs in the active link, and the K2 byte bridging status indication information is used for indicating that current service data is not bridged.

102, Transmitting, by the controller, a second negotiation message to the first gateway and the second gateway, so as to enable the second gateway to degrade to a standby status according to the second negotiation message.

The second negotiation message is used for indicating bridging service data on the active link to a protection link for transmission, where the active link is a link between the second gateway and the controller, and the protection link is a link between the first gateway and the controller. The second negotiation message includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

Further, the method further includes: receiving, by the controller, a third negotiation message transmitted by the first gateway, the third negotiation message is used for indicating that the bridging of the service data is completed.

The third negotiation message comprises K1 byte bridging request information and K2 byte bridging status indication information, the K1 byte bridging request information is used for indicating that a failure occurs in the active link, and the K2 byte bridging status indication information is used for indicating that the current service data is bridged from the active link.

In embodiments of the present invention, the controller receives the first negotiation message transmitted by the first gateway, and transmits the second negotiation message to both the first gateway and the second gateway, so as to enable the second gateway to bridge the service data originally on the active link of the second gateway to the protection link of the first gateway according to the second negotiation message, and enable the second gateway to degrade the active link and PW to be a standby status according to the second negotiation message. Therefore, when a failure occurs in the link between the first gateway and the second gateway, the problem that the first gateway and the second gateway simultaneously upgrade themselves to be an active status can be solved, it is possible to notify the second gateway to degrade itself to be a standby status, deactivate the active link and bridge the service data to the protection link, so that the service can go on normally, and thus reliability of the system and user experience can be improved.

Figure 2:
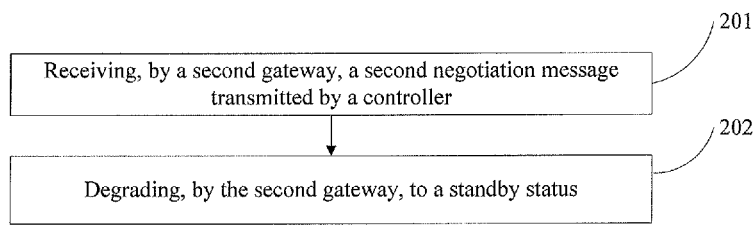
FIG. 2 is a flow chart of a method according to another embodiment of the present invention.

Another embodiment of the present invention provides a cross-device linear multiplex section protection method, as shown in FIG. 2, the method includes:

201, Receiving, by a second gateway, a second negotiation message transmitted by a controller.

The second negotiation message is used for indicating bridging service data on an active link to a protection link for transmission, where the active link is a link between the second gateway and the controller, and the protection link is a link between a first gateway and the controller. The second negotiation message includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

202, Degrading, by the second gateway, to a standby status.

Optionally, the degrading, by the second gateway, to the standby status, includes:

setting the active link as a standby status;

degrading a pseudo wire (PW) between the second gateway and a third gateway to a standby status, and transmitting a notification message to the third gateway, where the third gateway is a cell site gateway connected to a base station.

In embodiments of the present invention, the second gateway receives the second negotiation message transmitted by the controller, obtains a notification of bridging the service data to the protection link according to the second negotiation message, the second gateway degrades the active link and PW to be a standby status, and notifies the cell site gateway, so that service data transmission between the base station and the controller is completed through the protection link. Therefore, when a failure occurs in the link between the first gateway and the second gateway, the problem of service interruption caused by the second gateway failing to act as specified in the linear multiplex section protection (LMSP) protocol can be solved. Relevant service transmission link of the second gateway can be degraded automatically to be a standby status, and service data can be transmitted on the protection link of the first gateway, thereby guaranteeing that the service is not interrupted, and thus reliability of the system and user experience can be improved.

Figure 3:
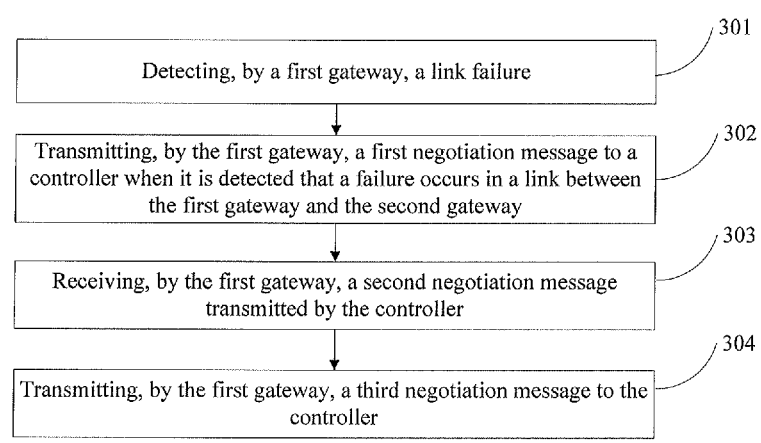
FIG. 3 is a flow chart of a method according to still another embodiment of the present invention.

Another embodiment of the present invention provides a cross-device linear multiplex section protection method, as shown in FIG. 3, the method includes:

301, Detecting, by a first gateway, a link failure.

302, Transmitting, by the first gateway, a first negotiation message to a controller when it is detected that a failure occurs in a link between the first gateway and the second gateway.

The first negotiation message is used for indicating that a failure occurs in an active link and requesting to the controller for bridging service data on the active link to a protection link, where the active link is a link between the second gateway and the controller, and the protection link is a link between the first gateway and the controller. The first negotiation message includes K1 byte bridging request information and K2 byte bridging status indication information, where the K1 byte bridging request information is used for indicating that a failure occurs in the active link, and the K2 byte bridging status indication information is used for indicating that bridging of the current service data does not occur.

303, Receiving, by the first gateway, a second negotiation message transmitted by the controller.

Upgrade to the active status according to the second negotiation message, where the second negotiation message is used for indicating bridging service data on the active link to the protection link for transmission. The second negotiation message includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

304, Transmitting, by the first gateway, a third negotiation message to the controller.

The third negotiation message is used for indicating that bridging of the service data is completed. The third negotiation message includes K1 byte bridging request information and K2 byte bridging status indication information, where the K1 byte bridging request information is used for indicating that a failure occurs in the active link, and the K2 byte bridging status indication information is used for indicating that the current service data is bridged from the active link.

Optionally, the upgrading to the active status according to the second negotiation message, includes:

setting the protection link as an active status;

upgrading a pseudo wire (PW) between the first gateway and a third gateway to an active status, and transmitting a notification message to the third gateway, where the third gateway is a cell site gateway connected to a base station.

In embodiments of the present invention, after detecting a link failure between the first gateway and the second gateway, the first gateway transmits the first negotiation message to the controller and requests for bridging the service data to the protection link; and performs the bridging of the service data after receiving the second negotiation message transmitted by the controller, and then transmits the third negotiation message to the controller after the bridging is completed, so as to notify the controller that the bridging is completed. The problem of service interruption caused by link failure between the first gateway and the second gateway is solved, and thus reliability of the system and the user experience are improved.

Figure 4:
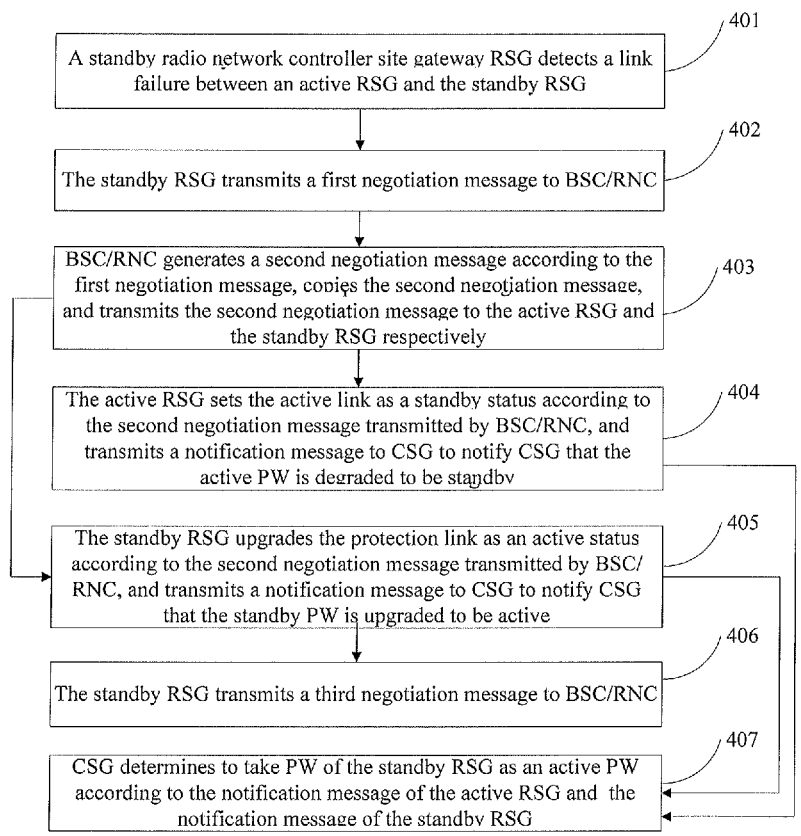
FIG. 4 is a flow chart of a method according to still another embodiment of the present invention.

Another embodiment of the present invention provides a cross-device linear multiplex section protection method, 1:1 multiplex section protection is deployed between a cell site and RNC/BSC, when a failure occurs in an inter-frame link between an active RSG and a standby RSG service data is bridged to a protection link, as shown in FIG. 4, the method includes:

401, A standby radio network controller site gateway (RSG) detects a link failure between the active RSG and the standby RSG.

Figure 5:
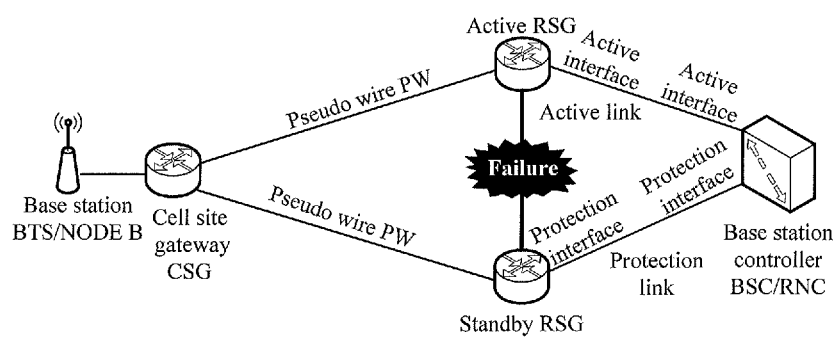
FIG. 5 is a schematic structural diagram of connections between devices according to another embodiment of the present invention.

For example, as shown in FIG. 5, the active RSG and the standby RSG are connected through an inter-frame link, when a failure occurs in the inter-frame link between the two, the active RSG and the standby RSG cannot sense status of the device at the opposite end, and then, both the active RSG and the standby RSG will consider that a failure occurs in the device at the opposite end.

According to the procedure in the prior art, when a failure occurs in the inter-frame link, on one aspect, the active RSG and the standby RSG simultaneously notify CSG that the active RSG/the standby RSG itself is upgraded to be an active status, so that the CSG transmits service data in the direction from a base station to BSC/RNC to the active RSG/the standby RSG itself, and then the active RSG/the standby RSG itself forwards it to BSC/RNC, the CSG judges according to PW redundant configuration of the CSG itself to determine the active RSG as the actual active device and transmits service data to the active RSG; on the other hand, the standby RSG negotiates with BSC/RNC through a protection interface according to the LMSP protocol, and determines to perform switching operation to bridge service data transmitted on an active link of the active RSG to a protection link for transmission, after the switching is determined, if BSC/RNC receives the service data transmitted by the active RSG at this time, the service data will be directly discarded.

In view of the above, the service data in the direction from the base station to BSC/RNC is transmitted by CSG to the active RSG, then is forwarded by the active RSG to BSC/RNC, and then is discarded by BSC/RNC; while the service data in the direction from BSC/RNC to the base station is duplicated into two copies, and is then transmitted to CSG by the active link of the active RSG and the protection link of the standby RSG respectively. Therefore, a transmission link and a reception link of the service data between the base station and BSC/RNC cannot be consistent, thereby resulting in service interruption.

In order to solve the problem of service interruption described above, execute the following steps:

402, The standby RSG transmits a first negotiation message to BSC/RNC.

For example, the first negotiation message includes K1 byte bridging request information and K2 byte bridging status indication information, where the content of the K1 byte bridging request information may be: 0xd1, where "d" indicates that a failure occurs in an active RSG; and "1" indicates that the message is transmitted through a protection interface on a protection link. The content of the K2 byte bridging status indication information may be: 0x08, where the latter "0" indicates that there is no link switching occurred currently, the service data is transmitted on the active link, and is not bridged to the protection link, and "8" indicates that the current multiplex section protection structure is in a 1:1 mode. Particularly, the multiplex section protection structure may be in a 1+1 mode and in a 1:n mode, where 1+1 mode is to provide one protection link for each active link, while 1:n mode is to provide one protection link for n active links.

In view of the above, the first negotiation message is used for notifying BSC/RNC that a failure occurs in the active link of the active RSG, and a switching is requested so as to bridge the service data on the active link to the protection link.

403, BSC/RNC generates a second negotiation message according to the first negotiation message, copies the second negotiation message, and transmits the second negotiation message to the active RSG and the standby RSG respectively.

For example, the second negotiation message includes K1 byte bridging request information and K2 byte bridging status indication information, the content of the K1 byte bridging request information may be: 0x21, where "2" indicates a reverse request returned by BSC/RNC to the standby RSG, indicating that the switching and the bridging of the service data is allowed, and "1" indicates that the message is transmitted through a protection interface on a protection link. The content of the K2 byte bridging status indication information may be: 0x18, where "1" indicates that link switching is being performed currently or has been performed, and the service data is bridged to the protection link, and "8" indicates that the current multiplex section protection structure is in a 1:1 mode.

In view of the above, the second negotiation message is used for notifying the standby RSG that the standby RSG is allowed to perform switching and to bridge the service data on the active link to the protection link; and also used for notifying the active RSG that the standby RSG is updated to be active, and to degrade the active RSG to be standby.

404, The active RSG sets the active link as a standby status according to the second negotiation message transmitted by BSC/RNC, and transmits a notification message to CSG to notify CSG that the active PW is degraded to be standby.

For example, the active RSG reads K byte information in the second negotiation message through an active interface, and when the content of the read K byte information indicates that BSC/RNC is in a switching status, that is, BSC/RNC has bridged service data of the active link to the protection link, the active RSG sets LMSP active link of the active RSG itself to be a standby status, and notifies CSG that the corresponding PW is degraded to be standby.

405, The standby RSG upgrades the protection link as an active status according to the second negotiation message transmitted by BSC/RNC, and transmits a notification message to CSG to notify CSG that the standby PW is upgraded to be active.

406, The standby RSG transmits a third negotiation message to BSC/RNC.

For example, the third negotiation message includes K1 byte bridging request information and K2 byte bridging status indication information, where the content of the K1 byte bridging request information may be: 0xd1, where "d" indicates that a failure occurs in an active RSG, and "1" indicates that the message is transmitted through a protection interface on a protection link. The content of the K2 byte bridging status indication information may be: 0x18, where "1" indicates that link switching is being performed currently or has been performed, and the service data is bridged to the protection link, and "8" indicates that the current multiplex section protection structure is in a 1:1 mode.

In view of the above, the third negotiation message is used for notifying BSC/RNC that the switching has been completed, and the standby RSG is upgraded to be active.

It should be noted that, steps 405 and 406 have no particular implementing sequences, and it is only necessary to perform them prior to step 407.

407, CSG determines to take PW of the standby RSG as an active PW according to the notification message of the active RSG and the notification message of the standby RSG.

Particularly, after determining the PW, CSG transmits service data in the direction from the base station to BSC/RNC through PW of the standby RSG, so as to guarantee that the bi-directional service data paths between the base station and BSC/RNC are consistent and the service goes on normally.

It should be noted that, the base station in this embodiment may be a base transceiver station (BTS)/NODE B, and a protection structure of the multiplex protection section includes, but not limited to, 1:1 mode or 1+1 mode.

In embodiments of the present invention, the standby RSG detects the link between the standby RSG and the active RSG; when a failure occurs in the link, the standby RSG transmits a first negotiation message to a BSC/RNC, and requests to upgrade the standby RSG itself to be an active status; after receiving the first negotiation message, the BSC/RNC transmits a second negotiation message to the standby RSG and the active RSG respectively, and notifies the standby RSG and the active RSG to perform bridging of service data, and to bridge service of the active RSG to the standby RSG; the active RSG degrades both the protection link and the pseudo wire (PW) to be the standby status after receiving the second negotiation message; the standby RSG upgrades both the protection link and the pseudo wire to be an active status after receiving the second negotiation message, and then transmits a third negotiation message to the BSC/RNC to notify BSC/RNC that bridging of the service data is completed. The problem of service interruption caused by link failure between the standby RSG and the active RSG is solved, thus reliability of the system and the user experience are improved.

Figure 6:
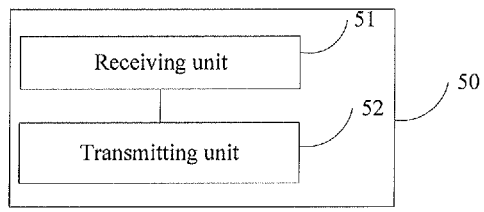
FIG. 6 is a schematic structural diagram of a controller according to another embodiment of the present invention.

Another embodiment of the present invention provides a controller 50, as shown in FIG. 6, the controller 50 includes:

a receiving unit 51, configured to receive a first negotiation message transmitted by a first gateway, where the first negotiation message is transmitted when the first gateway detects that a failure occurs in a link between the first gateway and a second gateway;

a transmitting unit 52, configured to transmit a second negotiation message to the first gateway and the second gateway respectively according to the first negotiation message received by the receiving unit 51, so as to enable the second gateway to degrade to a standby status according to the second negotiation message, where, the second negotiation message is used for indicating bridging service data on an active link to a protection link for transmission, the active link is a link between the second gateway and the controller 50, and the protection link is a link between the first gateway and the controller 50.

Further, the receiving unit 51 is further configured to:

receive a third negotiation message transmitted by the first gateway, where the third negotiation message is used for indicating that the bridging of the service data is completed.

The first negotiation message received by the receiving unit 51 includes K1 byte bridging request information and K2 byte bridging status indication information, where the K1 byte bridging request information is used for indicating that a failure occurs in the active link, and the K2 byte bridging status indication information is used for indicating that the bridging of the current service data does not occur.

The second negotiation message transmitted by the transmitting unit 52 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

The third negotiation message received by the receiving unit 51 includes K1 byte bridging request information and K2 byte bridging status indication information, where the K1 byte bridging request information is used for indicating that a failure occurs in the active link, and the K2 byte bridging status indication information is used for indicating that the current service data is bridged from the active link.

In embodiments of the present invention, the controller 50 receives the first negotiation message transmitted by the first gateway, and transmits the second negotiation message to both the first gateway and the second gateway, so as to enable the second gateway to bridge the service data originally on the active link of the second gateway to the protection link of the first gateway according to the second negotiation message, and enable the second gateway to degrade the active link and PW to be a standby status according to the second negotiation message. Therefore, when a failure occurs in the link between the first gateway and the second gateway, the problem that the first gateway and the second gateway simultaneously upgrade themselves to be an active status can be solved, it is possible to notify the second gateway to degrade the second gateway to be a standby status, deactivate the active link and bridge the service data to the protection link, so that the service can go on normally, and thus reliability of the system and user experience can be improved.

Figure 7:
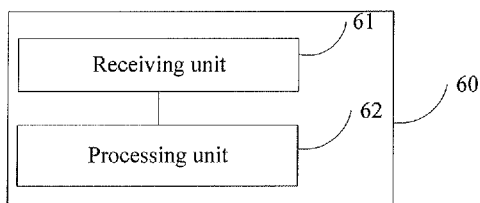
FIG. 7 and FIG. 8 are schematic structural diagrams of a second gateway according to another embodiment of the present invention.

Another embodiment of the present invention provides a second gateway 60, as shown in FIG. 7, the second gateway 60 includes:

a receiving unit 61, configured to receive a second negotiation message transmitted by a controller, where the second negotiation message is used for indicating bridging service data on an active link to a protection link for transmission, the active link is a link between the second gateway 60 and the controller, and the protection link is a link between a first gateway and the controller; and a processing unit 62, configured to degrade the second gateway 60 to a standby status according to the second negotiation message received by the receiving unit 61.

The second negotiation message received by the receiving unit 61 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

Figure 8:
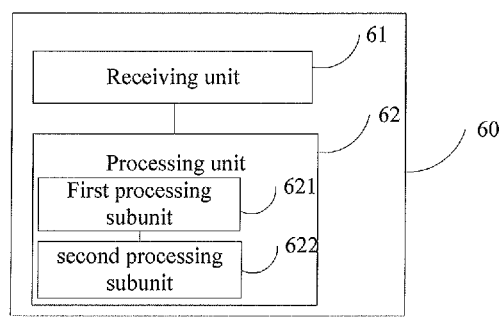

Further, as shown in FIG. 8, the processing unit 62 includes:

a first processing subunit 621, configured to set the active link as a standby status according to the second negotiation message received by the receiving unit 61; and a second processing subunit 622, configured to degrade a pseudo wire PW between the second gateway 60 and a third gateway to a standby status according to the second negotiation message received by the receiving unit 61, and transmit a notification message to the third gateway, where the third gateway is a cell site gateway connected to a base station.

In embodiments of the present invention, the second gateway 60 receives the second negotiation message transmitted by the controller, obtains a notification of bridging the service data to the protection link according to the second negotiation message, the second gateway 60 degrades the active link and PW to be a standby status, and notifies the cell site gateway, so that service data transmission between the base station and the controller is completed through the protection link. Therefore, when a failure occurs in the link between the first gateway and the second gateway 60, the problem of service interruption caused by the second gateway 60 failing to act as specified in the LMSP protocol can be solved. Relevant service transmission link of the second gateway 60 can be degraded automatically to be a standby status, and service data can be transmitted on the protection link of the first gateway, thereby guaranteeing that the service is not interrupted, and thus reliability of the system and user experience can be improved.

Figure 9:
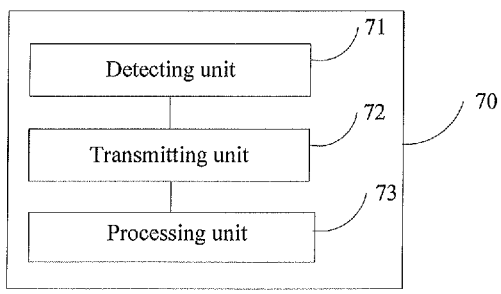
FIG. 9 and FIG. 10 are schematic structural diagrams of a first gateway according to another embodiment of the present invention.

Another embodiment of the present invention provides a first gateway 70, as shown in FIG. 9, the first gateway 70 includes:

a detecting unit 71, configured to detect a link failure;

a transmitting unit 72, configured to transmit a first negotiation message to the controller when it is detected by the detecting unit 71 that a failure occurs in a link between the first gateway 70 and a second gateway, where the first negotiation message is used for indicating that a failure occurs in an active link and requesting to the controller for bridging service data on the active link to a protection link, the active link is a link between the second gateway and the controller, and the protection link is a link between the first gateway 70 and the controller;

a processing unit 73, configured to receive a second negotiation message transmitted by the controller, and upgrade the first gateway 70 to an active status according to the second negotiation message, where the second negotiation message is used for indicating bridging service data on the active link to the protection link for transmission;

where the transmission unit 72 is further configured to transmit a third negotiation message to the controller, where the third negotiation message is used for indicating that the bridging of the service data is completed.

Figure 10:
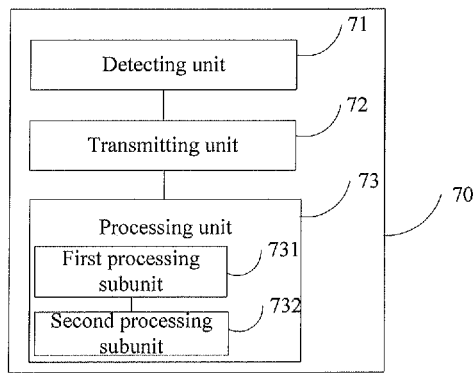

Further, as shown in FIG. 10, the processing unit 73 includes:

a first processing subunit 731, configured to set the active link as an active status; and a second processing subunit 732, configured to upgrade a pseudo wire (PW) between the first gateway and a third gateway to the active status, and transmit a notification message to the third gateway, where the third gateway is a cell site gateway connected to a base station.

The first negotiation message transmitted by the transmitting unit 72 includes K1 byte bridging request information and K2 byte bridging status indication information, where the K1 byte bridging request information is used for indicating that a failure occurs in the active link, and the K2 byte bridging status indication information is used for indicating that the bridging of the current service data does not occur.

The second negotiation message received by the processing unit 73 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

The third negotiation message transmitted by the transmitting unit 72 includes K1 byte bridging request information and K2 byte bridging status indication information, where the K1 byte bridging request information is used for indicating that a failure occurs in the active link, and the K2 byte bridging status indication information is used for indicating that the current service data is bridged on the active link.

In embodiments of the present invention, after detecting a link failure between the first gateway 70 and the second gateway, the first gateway 70 transmits the first negotiation message to the controller and requests for bridging the service data to the protection link; and performs the bridging of the service data after receiving the second negotiation message transmitted by the controller, and then transmits the third negotiation message to the controller after the bridging is completed, so as to notify the controller that the bridging is completed. The problem of service interruption caused by link failure between the first gateway 70 and the second gateway is solved, and thus reliability of the system and the user experience are improved.

Figure 11:
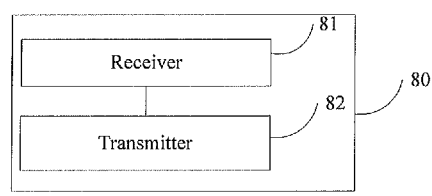
FIG. 11 is a schematic structural diagram of a controller according to another embodiment of the present invention.

Another embodiment of the present invention provides a controller 80, as shown in FIG. 11, the controller 80 includes:

a receiver 81, configured to receive a first negotiation message transmitted by a first gateway, where the first negotiation message is transmitted when the first gateway detects that a failure occurs in a link between the first gateway and a second gateway;

a transmitter 82, configured to transmit a second negotiation message to the first gateway and the second gateway respectively according to the first negotiation message, received by the receiver 81, so as to enable the second gateway to degrade to a standby status according to the second negotiation message, where, the second negotiation message is used for indicating bridging service data on an active link to a protection link for transmission, the active link is a link between the second gateway and the controller 80, and the protection link is a link between the first gateway and the controller 80.

Further, the receiver 81 is also configured to:

receive a third negotiation message transmitted by the first gateway, where the third negotiation message is used for indicating that the bridging of the service data is completed.

The first negotiation message received by the receiver 81 includes K1 byte bridging request information and K2 byte bridging status indication information, where the K1 byte bridging request information is used for indicating that a failure occurs in the active link, and the K2 byte bridging status indication information is used for indicating that the bridging of the current service data does not occur.

The second negotiation message transmitted by the transmitter 82 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

The third negotiation message received by the receiver 81 includes K1 byte bridging request information and K2 byte bridging status indication information, where the K1 byte bridging request information is used for indicating that a failure occurs in the active link, and the K2 byte bridging status indication information is used for indicating that the current service data is bridged from the active link.

In embodiments of the present invention, the controller 80 receives the first negotiation message transmitted by the first gateway, and transmits the second negotiation message to both the first gateway and the second gateway, so as to enable the second gateway to bridge the service data originally on the active link of the second gateway to the protection link of the first gateway according to the second negotiation message, and enable the second gateway to degrade the active link and PW to be a standby status according to the second negotiation message. Therefore, when a failure occurs in the link between the first gateway and the second gateway, the problem that the first gateway and the second gateway simultaneously upgrade themselves to be an active status can be solved, it is possible to notify the second gateway to degrade the second gateway to be a standby status, deactivate the active link and bridge the service data to the protection link, so that the service can go on normally, and thus reliability of the system and user experience can be improved.

Figure 12:
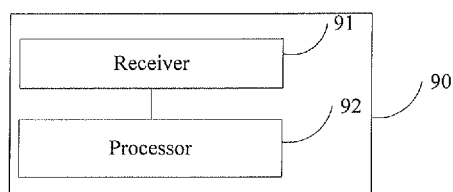
FIG. 12 is a schematic structural diagram of a second gateway according to another embodiment of the present invention.

Another embodiment of the present invention provides a second gateway 90, as shown in FIG. 12, the second gateway 90 includes:

a receiver 91, configured to receive a second negotiation message transmitted by a controller, where the second negotiation message is used for indicating bridging service data on an active link to a protection link for transmission, the active link is a link between the second gateway 90 and the controller, and the protection link is a link between a first gateway and the controller; and a processor 92, configured to degrade the second gateway 90 to a standby status according to the second negotiation message received by the receiver 91.

The second negotiation message received by the receiver 91 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

Further, the processor 92 is also configured to:

set the active link as a standby status according to the second negotiation message received by the receiver 91;

degrade a pseudo wire (PW) between the second gateway and a third gateway to a standby status according to the second negotiation message received by the receiver 91, and transmit a notification message to the third gateway, where the third gateway is a cell site gateway connected to a base station.

In embodiments of the present invention, the second gateway 90 receives the second negotiation message transmitted by the controller, obtains a notification of bridging the service data to the protection link according to the second negotiation message, the second gateway 90 degrades the active link and PW to be a standby status, and notifies the cell site gateway, so that service data transmission between the base station and the controller is completed through the protection link. Therefore, when a failure occurs in the link between the first gateway and the second gateway 90, the problem of service interruption caused by the second gateway 90 failing to act as specified in the LMSP protocol can be solved. Relevant service transmission link of the second gateway 90 can be degraded automatically to be a standby status, and service data can be transmitted on the protection link of the first gateway, thereby guaranteeing that the service is not interrupted, and thus reliability of the system and user experience can be improved.

Figure 13:
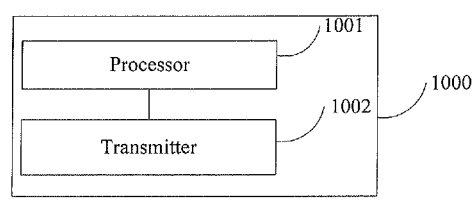
FIG. 13 is a schematic structural diagram of a first gateway according to another embodiment of the present invention.

Another embodiment of the present invention provides a first gateway 1000, as shown in FIG. 13, the first gateway 1000 includes:

a processor 1001, configured to detect a link failure;

a transmitter 1002, configured to transmit a first negotiation message to the controller when the processor 1001 detects that a failure occurs in a link between the first gateway 1000 and a second gateway, where the first negotiation message is used for indicating that a failure occurs in the active link and requesting to the controller for bridging service data on an active link to a protection link, the active link is a link between the second gateway and the controller, and the protection link is a link between the first gateway 1000 and the controller;

the processor 1001 is further configured to receive a second negotiation message transmitted by a controller, and upgrade the first gateway to an active status according to the second negotiation message, where the second negotiation message is used for indicating bridging service data on the active link to the protection link for transmission; and the transmitter 1002 is also configured to transmit a third negotiation message to the controller, where the third negotiation message is used for indicating that the bridging of the service data is completed.

Further, the processor 1001 is also configured to:

set the protection link as an active status;

upgrade a pseudo wire (PW) between the first gateway 1000 and a third gateway to the active status, and transmit a notification message to the third gateway, where the third gateway is a cell site gateway connected to a base station.

The first negotiation message transmitted by the transmitter 1002 includes K1 byte bridging request information and K2 byte bridging status indication information, where the K1 byte bridging request information is used for indicating that a failure occurs in the active link, and the K2 byte bridging status indication information is used for indicating that the bridging of the current service data does not occur.

The second negotiation message received by the processor 1001 includes K1 byte bridging request information and K2 byte bridging status indication information, where the K1 byte bridging request information is used for indicating bridging the service data to the protection link, and the K2 byte bridging status indication information is used for indicating that the current service data is bridged from the active link.

The third negotiation message transmitted by the transmitter 1002 includes K1 byte bridging request information and K2 byte bridging status indication information, where the K1 byte bridging request information is used for indicating that a failure occurs in the active link, and the K2 byte bridging status indication information is used for indicating that the current service data is bridged on the active link.

In embodiments of the present invention, after detecting a link failure between the first gateway 1000 and the second gateway, the first gateway 1000 transmits the first negotiation message to the controller and requests for bridging the service data to the protection link; and performs the bridging of the service data after receiving the second negotiation message transmitted by the controller, and then transmits the third negotiation message to the controller after the bridging is completed, so as to notify the controller that the bridging is completed. The problem of service interruption caused by link failure between the first gateway 1000 and the second gateway is solved, and thus reliability of the system and the user experience are improved.

The gateway and the controller according to embodiments of the present invention can achieve the method embodiments provided above, implementation of specific functions can be with reference to descriptions in the method embodiments, and no further details will be given here. The cross-device linear multiplex section protection method, the gateway and the controller provided in embodiments of the present invention can be applied to a scenario that the SDH network accesses to the public network in a dual-homing manner, but not limited thereto.

Persons skilled in the art can understand that all or part of the processes in the method provided in the embodiments above may be implemented by a program instructing relevant hardware. The program may be stored in a computer readable storage medium, and when the program is executed, the processes in the method according to the above embodiments are performed. Wherein, the storage medium may be a floppy disk, an optical disk, a read-only memory (ROM) or a random access memory (RAM) or the like.

The above descriptions are merely preferred embodiments of the present invention, but not intended to limit the protection scope of the present invention. Any modifications, variations or replacement that can be easily derived by persons skilled in the art without departing from the spirit of the present invention shall fall within the protection scope of the present invention. Therefore, the protection scope of the present invention is subject to the appended claims.

The invention claimed is:

1. A cross-device linear multiplex section protection method, comprising:
receiving, by a controller, a first negotiation message transmitted by a first gateway, wherein, the first negotiation message is transmitted when the first gateway detects that a failure occurs in a link between the first gateway and a second gateway; and
transmitting, by the controller, a second negotiation message to the first gateway and the second gateway, wherein the second negotiation message is used for indicating bridging service data on an active link to a protection link for transmission, the active link is a link between the second gateway and the controller, and the protection link is a link between the first gateway and the controller.

2. The method according to claim 1, further comprising:
receiving, by the controller, a third negotiation message transmitted by the first gateway, wherein the third negotiation message is used for indicating that the bridging of the service data is completed.

3. The method according to claim 2, wherein the third negotiation message comprises K1 byte bridging request information and K2 byte bridging status indication information, the K1 byte bridging request information is used for indicating that a failure occurs in the active link, and the K2 byte bridging status indication information is used for indicating that current service data is bridged from the active link.

4. The method according to claim 1, wherein the first negotiation message comprises K1 byte bridging request information and K2 byte bridging status indication information, the K1 byte bridging request information is used for indicating that a failure occurs in the active link, and the K2 byte bridging status indication information is used for indicating that the bridging of current service data does not occur.

5. The method according to claim 1, wherein the second negotiation message comprises K1 byte bridging request information and K2 byte bridging status indication information, the K1 byte bridging request information is used for the indicating bridging the service data to the protection link, and the K2 byte bridging status indication information is used for indicating that current service data is bridged from the active link.

6. A cross-device linear multiplex section protection method, comprising:
detecting, by a first gateway, a link failure;
transmitting, by the first gateway, a first negotiation message to a controller when it is detected that a failure occurs in a link between the first gateway and a second gateway, wherein the first negotiation message is used for indicating that a failure occurs in an active link and requesting to the controller for bridging service data on the active link to a protection link, the active link is a link between the second gateway and the controller, and the protection link is a link between the first gateway and the controller;
receiving, by the first gateway, a second negotiation message transmitted by the controller, and upgrading to an active status according to the second negotiation message, wherein the second negotiation message is used for indicating bridging the service data on the active link to the protection link for transmission; and
transmitting, by the first gateway, a third negotiation message to the controller, wherein the third negotiation message is used for indicating that the bridging of the service data is completed.

7. The method according to claim 6, wherein, the upgrading to the active status according to the second negotiation message, comprises:
setting the protection link as an active status;
upgrading a pseudo wire (PW) between the first gateway and a third gateway to an active status, and transmitting a notification message to the third gateway, wherein the third gateway is a cell site gateway connected to a base station.

8. A controller, comprising:
a receiver, configured to receive a first negotiation message transmitted by a first gateway, wherein, the first negotiation message is transmitted when the first gateway detects that a failure occurs in a link between the first gateway and a second gateway;
a transmitter, configured to transmit a second negotiation message to the first gateway and the second gateway respectively according to the first negotiation message received by the receiving unit, wherein the second negotiation message is used for indicating bridging service data on an active link to a protection link for transmission, the active link is a link between the second gateway and the controller, and the protection link is a link between the first gateway and the controller.

9. The controller according to claim 8, wherein, the receiver is further configured to:
receive a third negotiation message transmitted by the first gateway, wherein the third negotiation message is used for indicating that the bridging of the service data is completed.

10. A first gateway, comprising:
a detecting unit, configured to detect a link failure;
a transmitter, configured to transmit a first negotiation message to a controller when it is detected by the detecting unit that a failure occurs in a link between the first gateway and a second gateway, wherein the first negotiation message is used for indicating that a failure occurs in an active link and requesting to the controller for bridging service data on the active link to a protection link, the active link is a link between the second gateway and the controller, and the protection link is a link between the first gateway and the controller;
a processor, configured to receive a second negotiation message transmitted by the controller, and upgrade the first gateway to an active status according to the second negotiation message, wherein the second negotiation message is used for indicating the bridging of the service data on the active link to the protection link for transmission;
wherein the transmitter is further configured to transmit a third negotiation message to the controller, wherein the third negotiation message is used for indicating that the bridging of the service data is completed.

11. The first gateway according to claim 10, wherein the processor comprises:
a first processing subunit, configured to set the active link as an active status; and
a second processing subunit, configured to upgrade a pseudo wire (PW) between the first gateway and a third gateway to an active status, and transmit a notification message to the third gateway, wherein the third gateway is a cell site gateway connected to a base station.

* * * * *